Oct. 23, 1956    L. SPRARAGEN    2,767,444
WEATHERSEAL AND MOUNTING MEANS THEREFOR
AND METHOD OF MAKING SAME
Filed Aug. 31, 1953            3 Sheets-Sheet 1
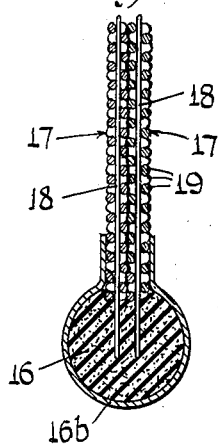
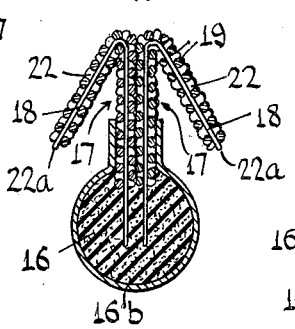
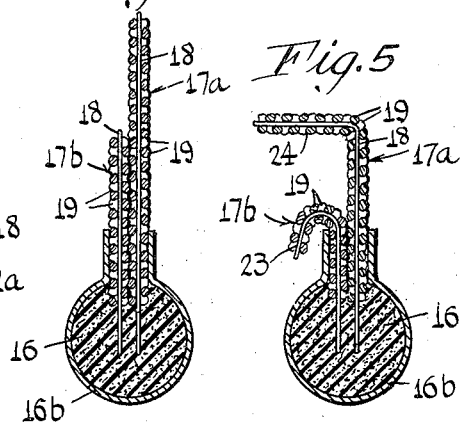
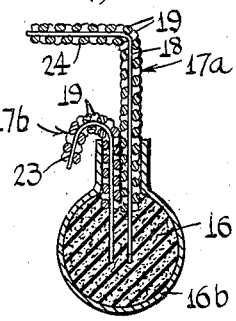
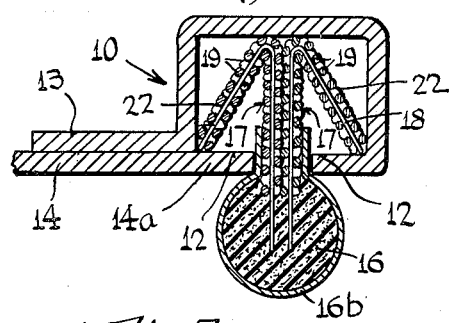
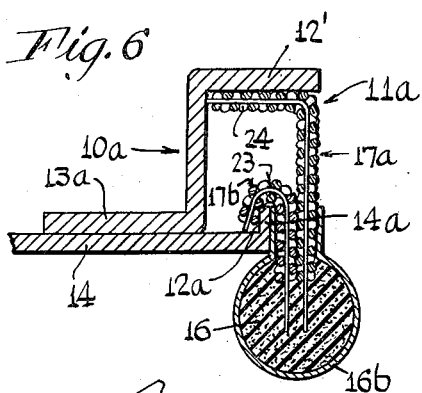
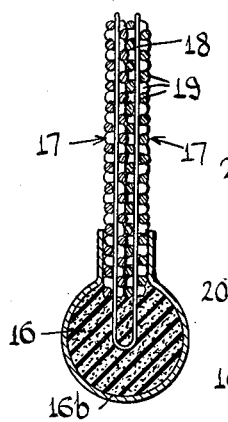
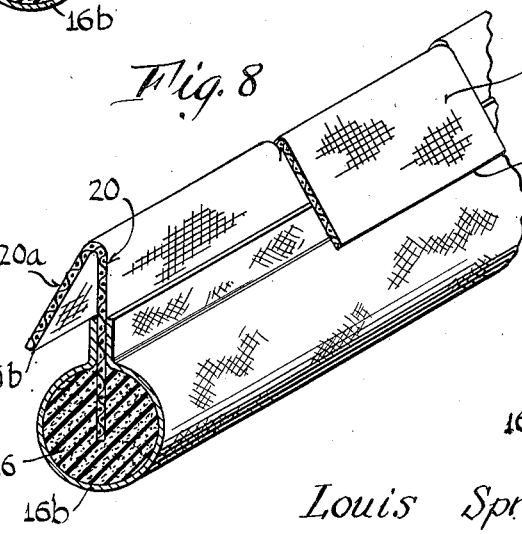
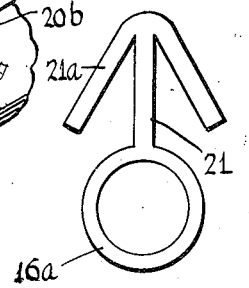
INVENTOR
*Louis Spraragen*
BY *Johnson and Kline*
ATTORNEYS

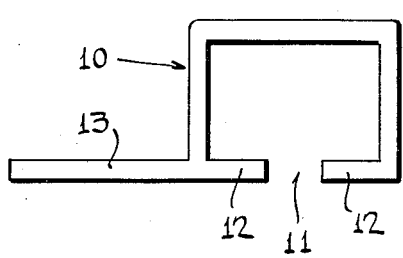
Fig. 10
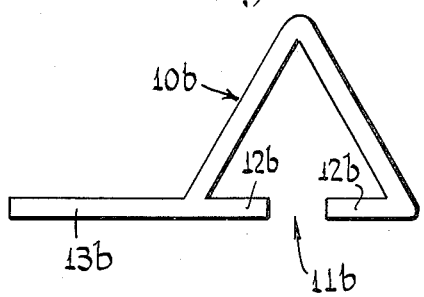
Fig. 11
Fig. 13
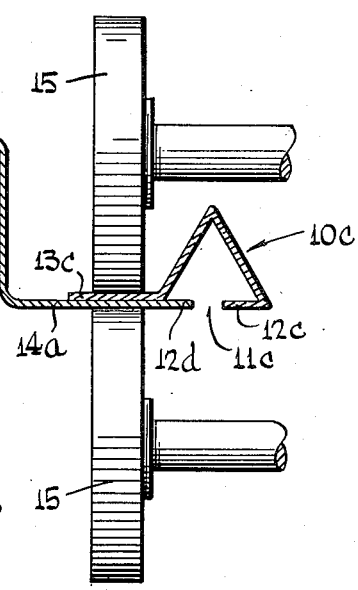
Fig. 12
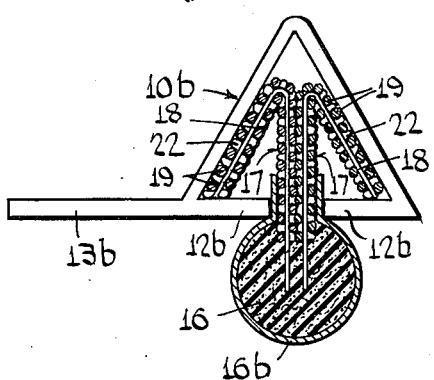
INVENTOR
Louis Spraragen

United States Patent Office 2,767,444
Patented Oct. 23, 1956

2,767,444

WEATHERSEAL AND MOUNTING MEANS THEREFOR AND METHOD OF MAKING SAME

Louis Spraragen, Fairfield, Conn., assignor to Bridgeport Fabrics, Inc., Bridgeport, Conn., a corporation of Connecticut Application August 31, 1953, Serial No. 377,280

16 Claims. (Cl. 20—69)

This invention relates to a novel weatherseal or weatherstrip and mounting means therefor and a method of making the same.

It is an object of the present invention to provide a weatherseal or weatherstrip and mounting therefor which can be readily installed and which will securely hold the weatherseal in sealing position against normal sealing pressures.

Another object of the invention is to provide a weatherseal or weatherstrip which can be easily assembled in its mounting means and which can be readily manufactured to fit various types of mounting means.

A still further object of the present invention is the provision of a method of making and installing a weatherseal in a simple and expeditious manner.

In carrying out these objects the present invention provides an elongate hollow mounting member or retainer with an opening or slot extending therealong with anchor engaging means adjacent the slot and a weathersealing member having anchoring means thereon cooperating with the anchor engaging means to securely hold the weatherseal in place.

A feature of the invention resides in the construction of the anchoring means for the weatherstrip which enables the weatherstrip to be either snapped through the opening of the hollow member and into position thereon in which it is held securely in place or by having the mounting and anchoring means for the weatherseal fed into the open end of the hollow mounting member, or through an access opening therein, into interlocked relation with the mounting member.

Another feature of the invention resides in the fact that the mounting member, which can be readily installed, may take various forms and the anchor means on the weatherstrip can be shaped to conform with the particular mounting means by a simple bending or forming operation of the mounting strip for the weatherseal or weatherstrip.

Other features and advantages of the invention will be apparent from the specification and claims when considered in connection with the drawings in which:

Figure 1 shows a sectional view of the weatherseal before the anchoring means is formed thereon.

Fig. 2 shows a sectional view of the weatherseal with the anchoring means formed thereon.

Fig. 3 shows a sectional view of the anchoring means in combination with the mounting member therefor.

Fig. 4 is a sectional view of another form of the invention.

Fig. 5 is a sectional view of the form of the invention shown in Fig. 4 with the anchoring means formed thereon.

Fig. 6 is a sectional view of the form of the invention of Fig. 5 in combination with a mounting member therefor.

Fig. 7 is a view similar to Fig. 1 showing another form of mounting and attaching strip.

Fig. 8 is a perspective view of another form of the invention.

Fig. 9 is an end view of a still further form of the invention.

Fig. 10 is an end view of one form of mounting means.

Fig. 11 is an end view of another form of the mounting means.

Fig. 12 is a sectional view of the mounting means of Fig. 11 with a weatherstrip of Fig. 2 mounted therein.

Fig. 13 is a view showing the mounting of another form of mounting means on an automobile body.

Figure 14:
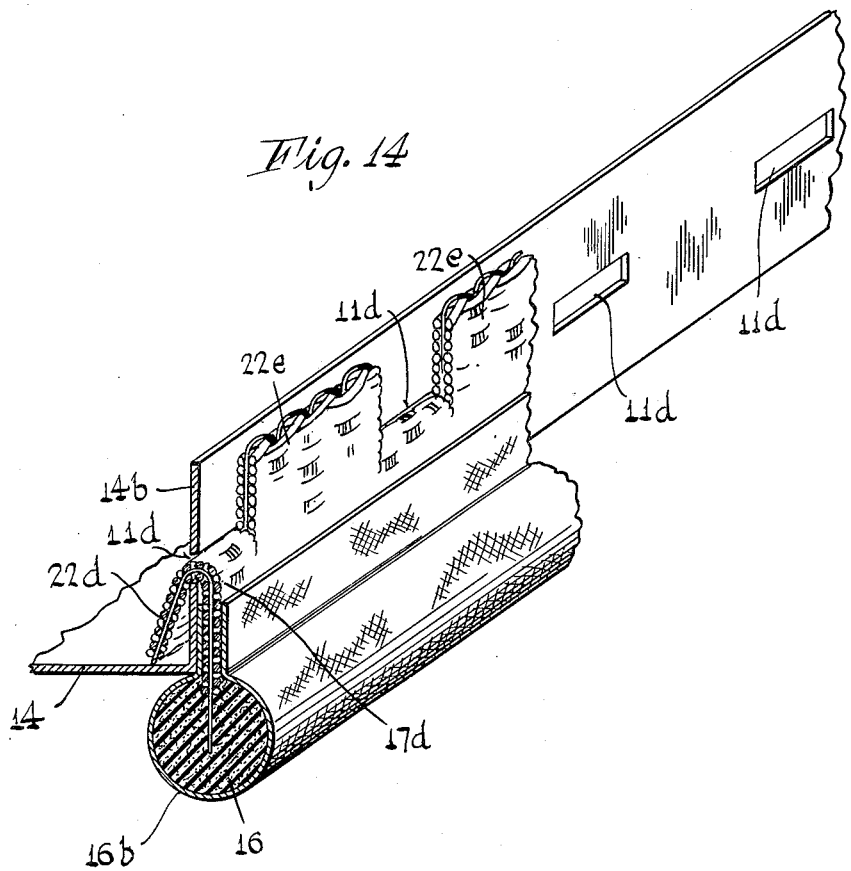
Fig. 14 shows another form of weatherseal and mounting therefor.

As shown in the drawings, the present invention involves a novel weatherseal or weatherstrip and mounting means or retainer therefor whereby the strip can be easily and quickly mounted and will be securely held in place to provide an adequate seal.

The means for mounting the strip on a structure to be sealed may take many forms to conform to the requirements of the particular installations. Preferably the mounting means or retainer comprises an elongate substantially rigid tubular mounting member having an opening or slot therealong with one or more abutments adjacent the opening to cooperate with anchoring means on the weatherstrip and has a projecting flange by which it can be secured to the frame of the automobile body or other supporting structure. While the mounting member may be formed of plastic or the like material, it is preferred to form it of metal and to secure it to the support by any suitable means such as spaced fasteners, welding or the like.

In the form of the mounting member shown in Figs. 3 and 10 the tubular member 10 is substantially C-shaped with abutment flanges 12 on each side of the opening 11 extending therealong and is provided with a laterally projecting flange 13 to be secured to the support 14. In the form of the invention shown in Fig. 3, the mounting means is bent up from sheet metal and the edge 14a of the support forms one of the flanges 12. In the form shown in Fig. 6 there is a substantially C-shaped member 10a opening at 11a on the side opposite the projecting flange 13a. The mounting member is bent up from sheet metal and the edge 14a of the support forms an abutment flange 12a. In the form of the invention shown in Fig. 11, the tubular member 10b is substantially an inverted V-shaped member with an opening 11b extending along the mouth of the V and inwardly facing abutment flanges 12b partially overlying the mouth of the V on the sides of the opening 11b to coact with the anchoring means on the weatherstrip to hold the weatherstrip in place. The mounting flange 13b in the form shown in Fig. 11 projects laterally to the side of the V and forms a continuation of one of the flanges 12b.

In the form of the invention shown in Fig. 13, a V-shaped mounting member 10c is bent up from sheet metal with an abutment flange 12c on one side of an opening 11c and a projecting flange 13c extending from the other side in position to be secured to the body 14 of an automobile or the like so that the flange 14a on the body of the automobile forms the other anchoring abutment 12d for coacting with the anchoring means on the weatherstrip.

While the mounting member in the forms of the invention shown in Figs. 3, 6 and 13 are fabricated from sheet material, those illustrated in Figs. 10 and 11 are shown as being formed as extruded sections of plastic or metal as the installation may require.

A feature of the invention resides in providing the projecting mounting flange 13 whereby the mounting member can be readily secured in place. As shown in Fig. 13, sufficient space is provided so that the member can be readily and quickly welded in place by welding rollers 15 which can be located therearound to engage both the mounting flange 13 and body flange 14a.

The weatherseal of the present invention comprises a bead which may be an elongate solid member 16, as shown in Figs. 1 through 8, of any suitable exterior configuration or may be an extruded hollow tubular member 16a as shown in Fig. 9 and may be formed of sponge rubber, rubber or other resilient plastic material such as vinyl compositions, polystyrene or the like as required. A suitable cover 16b can be provided to enclose the bead and at least a portion of the mounting strip, which mounting strip is secured to the bead to project therefrom and is provided with anchoring means formed thereon to easily and quickly secure the weatherstrip in place. The mounting means for the bead may be a pair of strips 17 of resilient material preferably of woven wire 18 and textile strands 19 such as shown in Figs. 1 through 7, a strip of screening 20 as shown in Fig. 8 or an extruded section 21 as shown in Fig. 9.

When the two strips 17 are employed, as shown in Figs. 1 through 7, they may extend an equal distance, as shown in Figs. 1 through 3 and 7 or may be positioned with one strip 17a extending outwardly from the bead to a greater extent than strip 17b as shown in Figs. 4 to 6, and may be formed as separate strips, with one edge of each strip secured to the bead as shown in Figs. 1 through 6 or formed by folding a wide strip, as shown in Fig. 7, with the folded end embedded in the bead.

While the extruded strip 21 may be extruded as a separate strip and anchored to the bead, it is at present preferred to form it as an integral part of the extruded tubular bead 16a as shown in Fig. 9.

The specific shape of the anchoring means depends upon the mounting member with which the device is to be used. When mounting members having opposed abutment flanges such as shown in Figs. 3 and 10 through 12 are employed, the anchoring means according to one form of the invention is produced by folding the outer edges of the mounting strips 17 outwardly and rearwardly to provide divergent sections 22 forming spaced abutments 22a facing the bead which are adapted to engage the abutment flanges when the strip is positioned in the opening, as shown in Fig. 3, so as to securely hold the weatherseal in sealing position. If a single mounting strip is used, as shown at 20 in Fig. 8, the anchoring means is formed by slitting the strip transversely at intervals and folding the sections 20a between the slits alternately to each side to provide rearwardly extending divergent sections forming abutments 20b which are adapted to engage the abutment flanges 12 when the strip is positioned in the opening. When an extruded mounting strip is used as shown at 21 in Fig. 9 it is formed with integral rearwardly diverging arms 21a which are adapted to engage the abutment flanges 12.

When the mounting means shaped as shown in Fig. 6 is employed, the anchoring means is formed by bending the edge of the shorter leg 17b backwardly into a loop 23 to interlock with the abutment flange 12a and by bending the longer leg 17a transversely at an angle in spaced relation to the loop to form an arm 24 to snap under the wall 12' of the mounting means and hold the weatherseal thereon against shifting under sealing pressure.

In the form of the invention shown in Fig. 14, the support 14 has an upstanding flange 14b which forms the mounting means for the weatherseal. The flange 14b, as shown, is provided with a plurality of spaced slots 11d. The weatherseal comprises a bead 16 having a cover 16b therearound and having a mounting strip 17d provided therein having one edge embedded in the bead with the strip projecting therefrom. The other edge of the strip is slit at intervals, as shown, and alternate portions 22d are folded over to provide laterally and downwardly extending legs which are adapted to be inserted through the openings 11d to the inner side of the flange 14b to mount the strip thereon, as shown, with the remaining edge portions 22e of the mounting strip extending upwardly above the slots and engaging the outer face of the mounting flange 14b so as to securely anchor the weatherseal in place and hold it in position to withstand the normal pressures incident to forming the seal therewith.

In making the weatherstrip a novel method is employed wherein the strips have one edge embedded in the bead as shown in Figs. 1, 4 and 7 and then are bent along their free edge to provide the anchoring portions as required by the mounting means by moving the weatherseal through suitable bending rollers. This provides a simple, yet highly convenient means of producing anchoring portions of various design, according to the type of mounting to be used, in a very expeditious manner.

Also, the present invention provides a novel method for securing a weatherseal on a mounting means by providing the mounting strip for the weatherseal with a bent edge portion adapted to cooperate with a slotted mounting member to interlock therewith and securely hold the weatherseal in place. This provides a self-contained mounting arrangement in which the weatherstrip can be easily assembled with the mounting means and adequately secured in position to withstand the normal pressures incident to forming the seal.

From the foregoing it will be seen that I have provided a novel weatherstrip and mounting means therefor which can be produced and installed with great ease. The anchoring means on the weatherstrip can be varied to suit its various requirements and can be formed simply by bending or otherwise forming the mounting strip to provide for an interlock with the mounting means.

In accordance with the present invention, because of the resiliency of the mounting strip the device can be inserted through the openings 11 in the mounting means and the anchoring portions will snap into anchored relation with the abutments on the mounting means, or the device can be inserted through the end of the mounting means, or a suitable access opening therein, by sliding it into position, with the mounting strip projecting through the opening 11 and the bead disposed on the outside of the mounting means in position to be engaged by a closure (not shown) or other coacting element to form the seal therewith.

Variations and modifications may be made within the scope of the claims and portions of the improvements may be used without others.

I claim:

1. A weatherseal comprising a cylindrical bead and a resilient, radially disposed mounting and anchoring strip means therefor having one edge embedded in the bead and the remainder of the strip projecting from the bead, the other edge of the strip being provided with laterally spaced edge portions, at least one of which faces the bead and is adapted to cooperate with a mounting member to anchor the weatherseal in place.

2. A weatherseal comprising a bead and a mounting and anchoring strip means therefor having one edge secured to the bead and the remainder of the strip projecting from the bead, the other edge having divergent flange portions extending laterally and rearwardly from the outer edge of the strip and which face the bead and form spaced abutments adapted to cooperate with a mounting member to anchor the weatherseal in place.

3. A weatherseal comprising a bead and a resilient mounting and anchoring strip means therefor comprising a pair of strips, each having one edge secured to the bead and the remainder of the strip projecting from the bead, the other edge of the strip being provided with laterally bent portions extending rearwardly and which face the bead and form spaced divergent abutments to cooperate with a mounting member to anchor the weatherseal in place.

4. A weatherseal comprising a bead and a resilient mounting and anchoring strip means therefor including a pair of strips of woven fiber warps and transversely extending wires, said strips being secured to the bead to project therefrom and having the projecting edges bent laterally to provide spaced anchoring portions to cooperate with anchor engaging means on a mounting members to anchor the weatherseal in place.

5. A weatherseal comprising a bead and a resilient mounting and anchoring strip means therefor comprising a pair of strip members, each having one edge secured to the bead, one of the members projecting from the bead a greater extent than the other, the outer edge of the shorter member being bent laterally and rearwardly adjacent the bead to form an abutment flange facing the bead and the outer edge of the longer member being bent laterally to the member to form an outwardly spaced abutment adapted to cooperate with a mounting member to anchor the weatherseal in place.

6. A weatherseal comprising a bead and a resilient mounting and anchoring strip means therefor comprising an elongate strip folded longitudinally to form a pair of strip members, the folded edge being secured to the bead with the pair of strip members projecting therefrom and having their free edges provided with laterally bent portions to form spaced abutments to cooperate with a mounting member to anchor the weatherseal in place.

7. A weatherseal comprising a bead and a resilient mounting and anchoring strip member therefor having one edge secured to the bead and the other edge having transversely spaced slits, the member between the slits extending alternately to opposite sides thereof to form divergent flanges extending laterally and rearwardly from the outer edge of the member to face the bead and form spaced abutments adapted to cooperate with a mounting member to anchor the weatherseal in place.

8. A weatherseal comprising an extruded hollow bead and an integral extruded mounting and anchoring strip member therefor projecting from the bead with the edge thereof formed with divergent flanges extending laterally and rearwardly from the outer edge of the strip member to face the bead and form spaced abutments adapted to cooperate with a mounting member to anchor the weatherseal in place.

9. In combination, an elongate rigid hollow mounting member having a longitudinally extending opening and adjacent anchor engaging means and having means for mounting said member on a support, and a weatherseal mounted thereon comprising a bead and a mounting and anchoring strip means cooperating with the mounting member to anchor the weatherstrip thereto, said strip means having one edge secured to the bead and the other edge provided with laterally extending anchor portions adapted to pass into said mounting member to cooperate with the anchor engaging means to anchor the weatherseal thereto.

10. In combination, an elongate rigid hollow mounting member having a slot therealong forming inwardly facing shoulders and having means for mounting said member on a support, and a weatherseal mounted thereon comprising a bead and a flat resilient mounting and anchoring strip means cooperating with the mounting member to anchor the weatherstrip thereto, said strip means extending through said slot and having one edge secured to the bead and the other edge provided with laterally and rearwardly bent divergent edge portions adapted to pass into said mounting member through said slot and snap into cooperating relation with the shoulders to anchor the weatherseal thereto.

11. In combination, an elongate, rigid, hollow mounting member having a slot therein and adjacent inwardly facing shoulders and having a flange for mounting the member on a support, and a weatherseal mounted thereon comprising a bead and a resilient mounting and anchoring strip means cooperating with the mounting member to anchor the weatherstrip thereto, said strip means having one edge secured to the bead and the other edge provided with laterally bent edge portions adapted to be located within said mounting member to cooperate with the shoulders to anchor the weatherseal thereto.

12. In combination, an elongate, rigid hollow mounting member having an opening therein and adjacent inwardly facing shoulders, and a weatherseal mounted thereon comprising a bead and a resilient mounting and anchoring strip means secured thereto to project therefrom and having on the projecting edge, laterally extending anchoring portions cooperating with the shoulders to anchor the weatherstrip thereto, said strip means comprising woven fiber warps and transversely extending wires and the anchoring portions comprising the bent edge portion extending laterally of the strip means.

13. In combination, an elongate, rigid, C-shaped mounting member having longitudinal anchor engaging means extending along the opening in the C and a laterally projecting mounting flange for mounting the member on a support, and a weatherseal mounted thereon comprising a bead and a mounting and anchoring strip means cooperating with the mounting member to anchor the weatherstrip thereto, said strip means having one edge secured to the bead and the other edge provided with laterally extending anchor portions adapted to pass into said C-shaped member and into engagement with the anchor engaging means to anchor the weatherseal thereto.

14. In combination, an elongate, rigid, inverted V-shaped mounting member having a longitudinally extending opening along the mouth of the V and adjacent anchor engaging means overlying a portion of said mouth and having means for mounting the member on a support, and a weatherseal mounted thereon comprising a bead and a mounting and anchoring strip means cooperating with the mounting member to anchor the weatherstrip thereto, said strip means having one edge secured to the bead and the other edge provided with laterally and rearwardly extending anchor portions adapted to pass into said mounting member and lie along the walls of the V with the edges thereof engaging the anchor engaging means to anchor the weatherseal thereto.

15. A weatherseal comprising a bead and a resilient mounting and anchoring strip member therefor having one edge secured to the bead and the other edge having transversely spaced slits, alternate portions of the strip between said slits being bent laterally and rearwardly from the outer edge of the member to face the bead and form spaced abutments adapted to cooperate with a mounting member to anchor the weatherseal in place.

16. In combination, an elongate, rigid mounting member provided with an upwardly extending flange having spaced slots therein, and a weatherseal mounted thereon comprising a bead and a resilient mounting and anchoring strip means cooperating with the mounting member to anchor the weatherstrip thereto, said strip means having one edge secured to the bead and the other edge provided with a plurality of spaced slits, alternate portions of the edge of the strip between the slits being bent laterally and rearwardly and adapted to be passed through the slots and interlock with the inner face of said mounting member, and the remaining edge portion of the strip extending above the slots and engaging the outer face of the flange whereby said weatherseal is anchored thereto.

References Cited in the file of this patent

UNITED STATES PATENTS

| | | |
|---|---|---|
| 2,146,090 | O'Rourke | Feb. 7, 1939 |
| 2,319,709 | Spraragen | May 18, 1943 |
| 2,554,452 | Bright | May 22, 1951 |

FOREIGN PATENTS

| | | |
|---|---|---|
| 955,973 | France | Jan. 23, 1950 |
| 655,299 | Great Britain | July 18, 1951 |